United States Patent
Ambilkar et al.

(10) Patent No.: US 7,953,121 B2
(45) Date of Patent: May 31, 2011

(54) METHOD AND SYSTEM FOR SYNCHRONIZING TRANSPORT STREAMS OF MULTIPLE TRANSPONDERS FOR AREA CRITICAL APPLICATIONS

(75) Inventors: Shridhar Narasimha Ambilkar, Bangalore (IN); Girish Gopala Kurup, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/173,164

(22) Filed: Jul. 15, 2008

(65) Prior Publication Data
US 2010/0017841 A1 Jan. 21, 2010

(51) Int. Cl.
*H01J 3/06* (2006.01)
(52) U.S. Cl. ..... 370/503; 370/401; 370/328; 375/240.1; 375/260; 725/68
(58) Field of Classification Search ........................ None
See application file for complete search history.

(56) References Cited

U.S. PATENT DOCUMENTS

| 5,256,912 | A | 10/1993 | Rios |
| 6,157,673 | A * | 12/2000 | Cuccia ........................ 375/240 |
| 7,035,355 | B2 | 4/2006 | Lais et al. |
| 7,161,994 | B2 | 1/2007 | Shah et al. |
| 7,225,458 | B2 * | 5/2007 | Klauss et al. .................. 725/63 |
| 2004/0181813 | A1 * | 9/2004 | Ota et al. ...................... 725/131 |
| 2008/0127277 | A1 * | 5/2008 | Kuschak ........................ 725/74 |
| 2009/0055870 | A1 * | 2/2009 | Horibe ........................... 725/46 |

* cited by examiner

*Primary Examiner* — Bob A Phunkulh
(74) *Attorney, Agent, or Firm* — Sprusons and Ferguson; Grant A. Johnson

(57) ABSTRACT

Disclosed is a transport stream synchronizing system for synchronizing transport streams output from a plurality of transponders and decoded by a plurality of tuners. The transport stream synchronizing system comprises a tuner selector operable to select one transport stream out of a plurality of transport streams decoded by the plurality of tuners, a transport packet synchronizer operable receive the transport stream selected by the tuner selector, and synchronize the received transport stream; and a transport packet arbiter and router operable to receive a synchronized transport stream from the selected tuner, and route the received synchronized transport stream to a predetermined destination.

14 Claims, 6 Drawing Sheets

METHOD AND SYSTEM FOR SYNCHRONIZING TRANSPORT STREAMS OF MULTIPLE TRANSPONDERS FOR AREA CRITICAL APPLICATIONS

TECHNICAL FIELD

The present invention relates generally to digital video broadcast systems, and in particular to synchronizing systems used therein.

BACKGROUND

In communication systems, a transponder receives and amplifies incoming signals, for example, an incoming signal from a satellite, and retransmits the amplified signal on a different frequency. With data compression and multiplexing, several video and audio channels may travel through a single transponder.

The output of the transponder is connected to a tuner for decoding. The tuner receives the output of the transponder and converts the output, having a different frequency, into a form suitable for processing. The output of the tuner is, for example, used by a synchronizer to establish the boundaries of the incoming data. After synchronization, markings establishing the boundaries of the incoming data are forwarded with the data to further modules. A transport packet arbiter and router is provided to handle multiple synchronized data packets from the synchronizer.

In a Digital Video Broadcast (DVB) system, for example, a transport stream is output by a transponder and decoded by a tuner. The transport stream typically includes packets of constant size to facilitate the addition of error-correction codes and interleaving in a higher layer. Each packet is 188 bytes long. The format of a transport packet is shown in FIG. 1.

The transport stream packet begins with a header of 4 bytes. The remainder of the packet carries data known as the payload. The first byte of the header is a sync byte and has a unique pattern represented by a predetermined bit pattern, for example, 0×47 (hexadecimal) i.e. 0100 0111 (binary).

The incoming transport stream is asynchronous to the DVB system, requiring the DVB system to synchronize the transport stream. Synchronization means are necessary for identifying the sync byte 0×47, and then establishing the boundaries of a packet by gathering 188 bytes including the sync byte.

In an application where multiple transponders with multiple tuners are present, each tuner output and hence each transport stream needs to be synchronized before being routed to its destination. A conventional multiple tuner transport stream synchronization system 200 is shown in FIG. 2. Note that in FIG. 2 and subsequent figures, multiple instances of an identical module are labelled with letter suffixes. Use in this description of the label without the letter suffix refers to any one of the identical instances of the corresponding module.

In the conventional multiple tuner transport stream synchronization system 200, the output of each transponder 210 is connected to a corresponding tuner 220 to extract the transport stream. The output transport stream of a tuner 220 is connected to a synchronizer 230 for synchronization before being routed to its destination by a transport packet arbiter and router 240.

The transport packet synchronizer 230 identifies the sync byte 0×47 and establishes the packet boundaries.

Difficulties may arise in the detection of the sync byte 0×47 of a packet when the payload contains data matching a 0×47 byte.

FIG. 3 shows a snapshot of a transport stream of incoming data from the tuner 220 to the transport packet synchronizer 230. FIG. 3 illustrates a scenario where bytes other than the sync byte in the packet are 0×47. As the start of a packet is not inherently identified, the correct sync byte 0×47 needs to be captured from this stream. An occurrence of 0×47 may represent the actual sync byte of the header or may represent a part of the payload data. Differentiating between the sync byte 0×47 and normal data 0×47 is not possible based on a single identified occurrence of 0×47. Synchronization is identified by detecting a repetition of 0×47 every 188 bytes.

For example, an attempt to synchronize the transport stream of FIG. 3 first identifies byte 0 as matching the sync pattern 0×47. The remaining 187 bytes are then counted to identify the transport packet boundary. If byte 0 were a proper sync byte, the second packet would start at byte 188 with another sync byte 0×47. As shown in FIG. 3, however, the $188^{th}$ byte has a data of 0×22. In this manner, it is determined that the first occurrence of 0×47 is not a sync byte. Another occurrence of a sync pattern is therefore searched for. It should be noted, however, that the second occurrence of the sync pattern 0×47 occurring at byte 1, which in this scenario was an actual sync byte, has already been lost while counting the incoming data for the first occurrence of 0×47. Therefore, only the next occurrence of the sync pattern 0×47, after 188 byte from the first occurrence of 0×47 have been counted (ie. byte 189), can be identified. If the next identifiable occurrence of 0×47 is again not a sync byte, the process is repeated. Synchronization of a transport stream may therefore take a long time. Until the transport stream is synchronized, further processing cannot be performed. In some cases synchronization may never be achieved.

The logic for a conventional synchronizer is typically complex and large, occupying a large amount of silicon area. In silicon area critical applications it becomes difficult to fit the conventional logic shown in FIG. 2 alongside other logic blocks. Further, once synchronization is achieved, the synchronizer is idle for most of the time.

There is a need for a more efficient usage of logic to synchronize the transport stream from multiple transponders/tuners.

SUMMARY

According to one aspect of the present invention, there is disclosed a transport stream synchronizing system for synchronizing transport streams output from a plurality of transponders and decoded by a plurality of tuners, the transport stream synchronizing system comprising:

a tuner selector operable to select one transport stream out of a plurality of transport streams decoded by the plurality of tuners;

a transport packet synchronizer operable receive the transport stream selected by the tuner selector, and synchronize the received transport stream; and a transport packet arbiter and router operable to receive a synchronized transport stream from the selected tuner, and route the received synchronized transport stream to a predetermined destination.

According to a second aspect, there is disclosed a method of synchronizing a plurality of transport streams output from a plurality of transponders and decoded by a plurality of tuners, the method comprising:

selecting, in a round robin order, each transport stream out of the plurality of transport streams decoded by the plurality of tuners;
synchronizing the selected decoded transport stream; and
routing the synchronized transport stream to a predetermined destination

BRIEF DESCRIPTION OF THE DRAWINGS

Aspects of the prior art and one or more embodiments of the present invention are described with reference to the drawings in which.

DETAILED DESCRIPTION

Disclosed herein is a method and system for synchronizing multiple transponders in silicon area critical applications. In the following detailed description, reference is made to the accompanying drawings that form a part hereof, and in which is shown by way of illustration specific exemplary embodiments in which the invention may be practised. These embodiments are described in sufficient detail to enable those skilled in the art to practise the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

According to the method and system disclosed herein, one synchronizer is employed for multiple tuner transport stream synchronization. In this manner, the area required by the logic of the system is significantly reduced, as compared to conventional methods/systems which employ multiple synchronizers.

Figure 4:
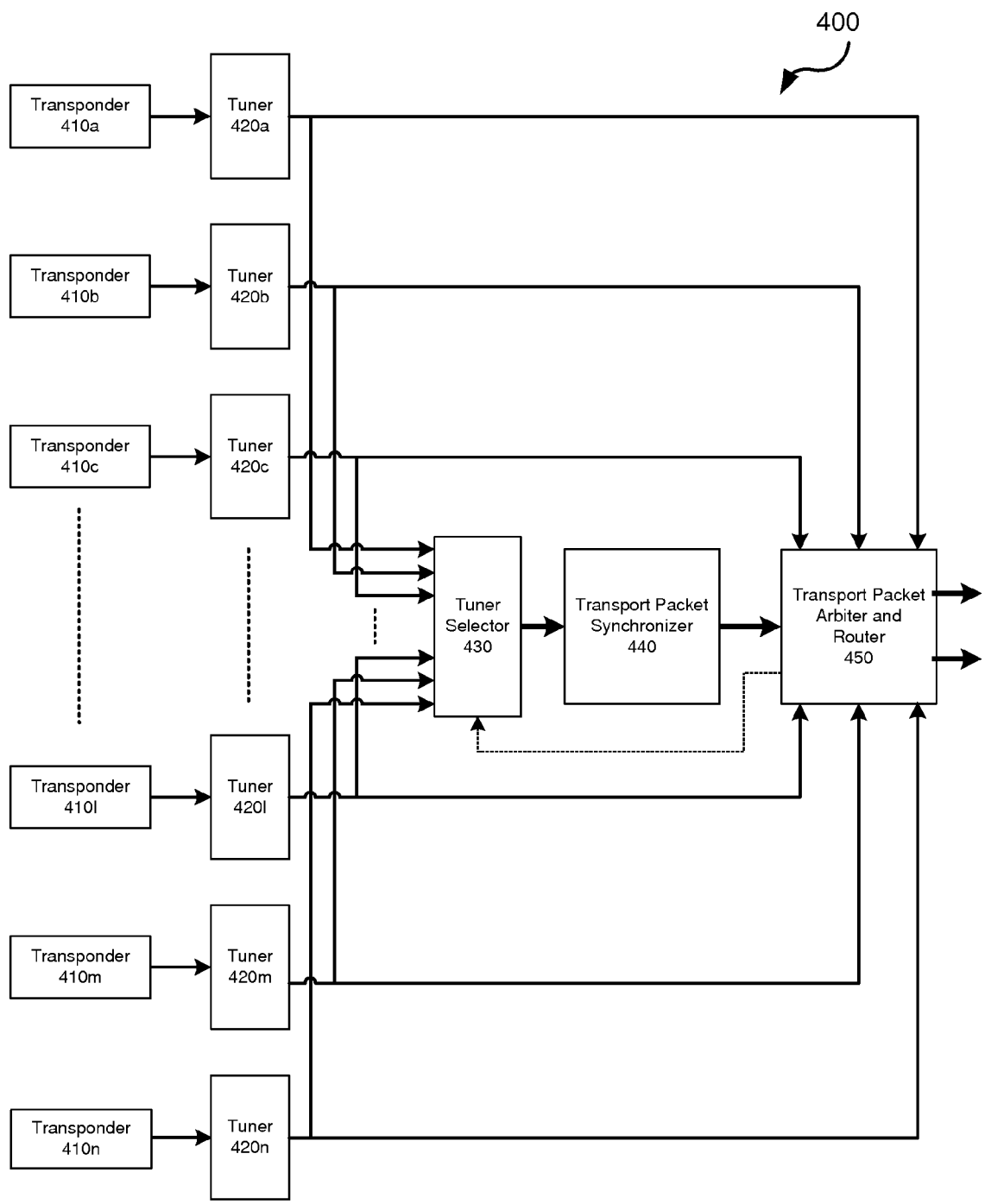
FIG. 4 illustrates a system for synchronizing and routing multiple transponder transport streams according to an embodiment of the present invention.

FIG. 4 schematically illustrates a digital video broadcast system 400 according to an embodiment of the present invention.

The system 400 includes a plurality of transponders 410a ... 410n and corresponding tuners 420a ... 420n, a tuner selector 430 operable to receive outputs from each of the tuners 420a ... 420n, a transport packet synchronizer 440 operable to receive a transport stream from a tuner 410 ... 410n selected by the tuner selector 430, and a transport packet arbiter and rerouter 450 to which the output of the transport packet synchronizer 440 is input.

The arbiter 450 is operable to select a tuner 420a ... 420n for synchronization in a round robin fashion, and maintains an indication of the synchronization status of each tuner 420a ... 420n. The arbiter 450 includes a timer mechanism for avoiding deadlocks in the event of encountering an unsynchronizable transport stream. The arbiter 450 is operable to further periodically check the synchronization status of each tuner 420a ... 420n, and perform re-synchronization if necessary. The arbiter 450 by means of its output to tuner selector 430 determines the order of tuner access to the transport packet synchronizer 440, and prevents multiple operations that should not occur simultaneously from doing so. The arbiter 450 thus ensures that only one tuner output is selected for synchronization at any time. The arbiter 450 generates a "select" signal for the tuner selector 430. The "select" signal is shown in FIG. 4 as a dotted line from arbiter 450 to the tuner selector 430. In one embodiment, the tuner selector 430 is a multiplexer (MUX).

The tuner selector 430 is operable to select tuner outputs for synchronization. The tuner selection is performed by the arbiter 450 by using the tuner selector 430 based on a round robin order. The system 400 of FIG. 4 is exemplarily provided with 8 tuners 420a ... 420n. It is to be understood that any number of tuners 420a ... 420n may be provided. On reset, the first tuner 420a is selected by the arbiter 450 through tuner selector 430 for synchronization, and the output from the first tuner 420a is passed to the transport packet synchronizer 440. The transport packet synchronizer 440 synchronizes the output from the first tuner 420a and asserts a "sync" signal to the arbiter 450 by which the arbiter 450 can identify packet boundaries and reroute packets from the first transport packet stream. The asserted sync signal indicates the transport packet stream from the selected tuner is synchronized. When the packet is rerouted to the next level beyond the arbiter 450, the next levels need to know the packet boundaries and hence such a sync signal is necessary. Once the arbiter 450 recognizes that the first tuner 420a is synchronized, the second tuner 420b is selected by the arbiter 450 through the tuner selector 430 for synchronization.

In the above described manner, the tuners 420a ... 420n are synchronized in round robin order, and the synchronization status for each tuner 420a ... 420n is maintained by the arbiter 450. Once all tuner outputs are synchronized, the transport packet synchronizer 440 is left idle until one or more data streams drops out of sync. Synchronization loss is detected by sync monitor logic forming part of the arbiter 450 according to one embodiment shown in FIG. 5 and described in more detail below.

In some cases, such as when a tuner is faulty, the transport packet synchronizer 440 may not be able to achieve synchronization. In order to avoid a deadlock scenario in which the transport packet synchronizer 440 stalls indefinitely while attempting to synchronize the output from, for example, a faulty tuner, a timer mechanism is provided in arbiter 450 to mark the tuner as "dead" if synchronization is not achieved within a predetermined period of time. In this situation, the next tuner will be selected for synchronization. As the tuner selection scheme is operated in a round robin order, all unsynchronized tuners including tuners marked as "dead" will be repeatedly selected for synchronization. In this manner, when "dead" tuners are replaced with working tuners, the new tuners will be selected for synchronization.

Figure 5:
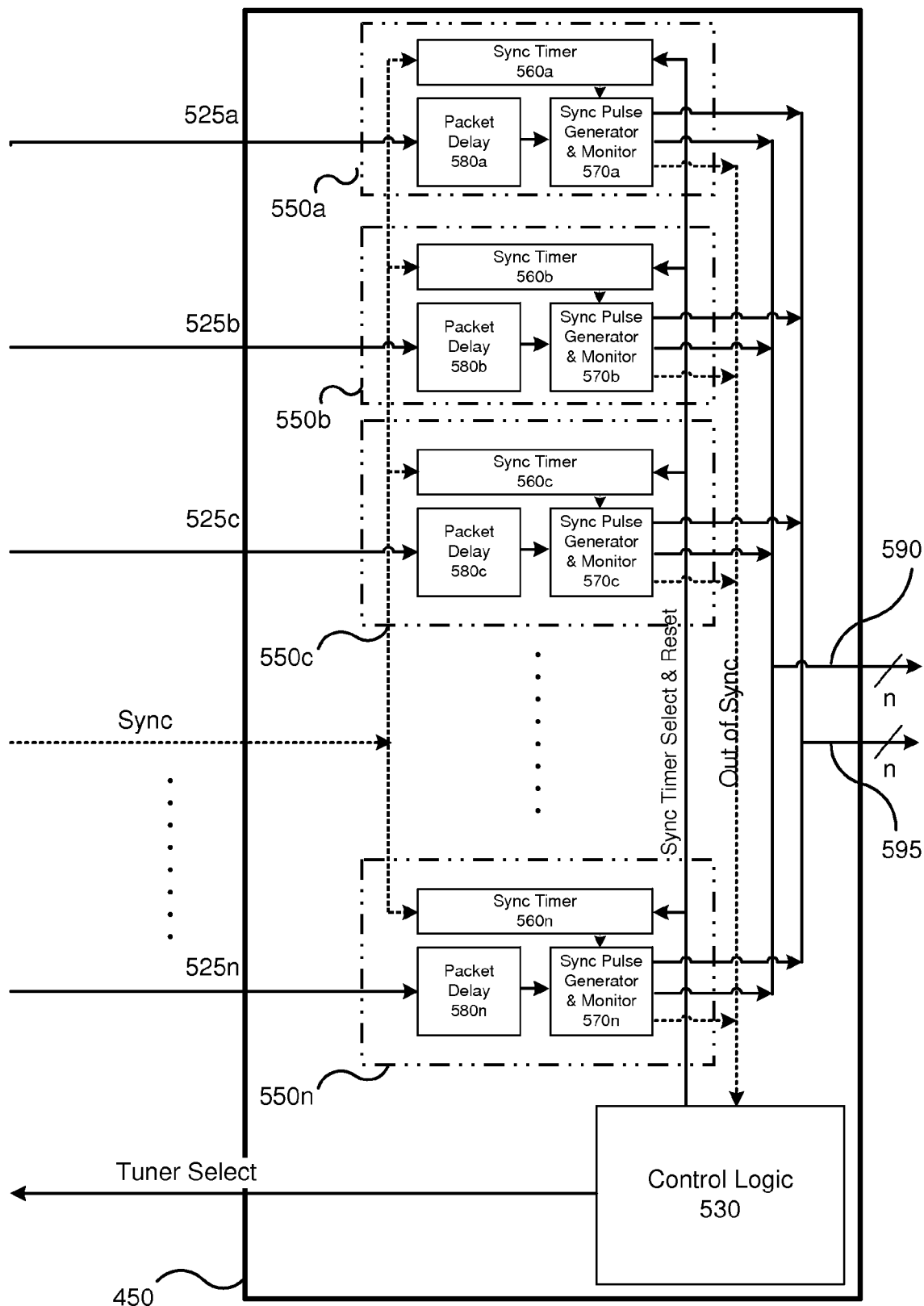
FIG. 5 illustrates the arbiter of the system of FIG. 4 in more detail.

FIG. 5 illustrates the transport packet arbiter and router 450 of the system 400 in greater detail. Inputs to the arbiter 450 include one or more digital data sources 525a-525n. The arbiter 450 includes one or more sync timing logic blocks 550a -550n, one for each digital data source 525. Each sync timing logic block 550 includes a sync timer 560, a sync pulse generator and monitor 570, and packet delay block 580.

The arbiter 450 also includes a control logic block 530. The control logic block 530:

1 Generates a Tuner Select signal for the tuner selector 430 to select one of the tuners 440.
2 Controls the sync timers 560. It generates resets and start timer signals for the sync timers 560.

3 Implements deadlock avoidance logic. If any of the tuners 440 is dead then that tuner is temporarily excluded from the tuner synchronization list.

4 Maintains a list of tuners, categorised as synchronized tuners and dead tuners.

Figure 1:
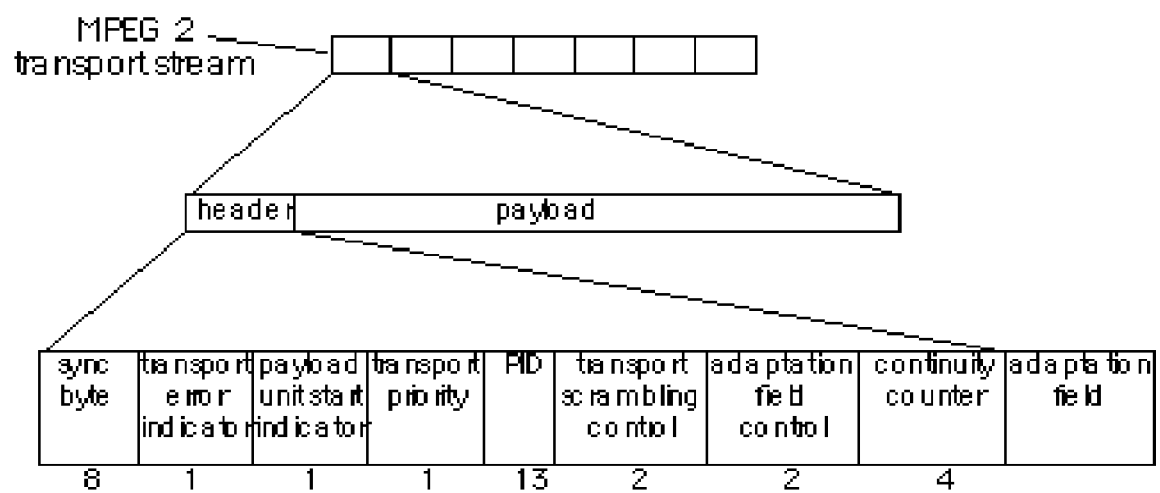
FIG. 1 illustrates a structure of a transport packet of a transport stream in a digital video broadcast system.
Figure 2:
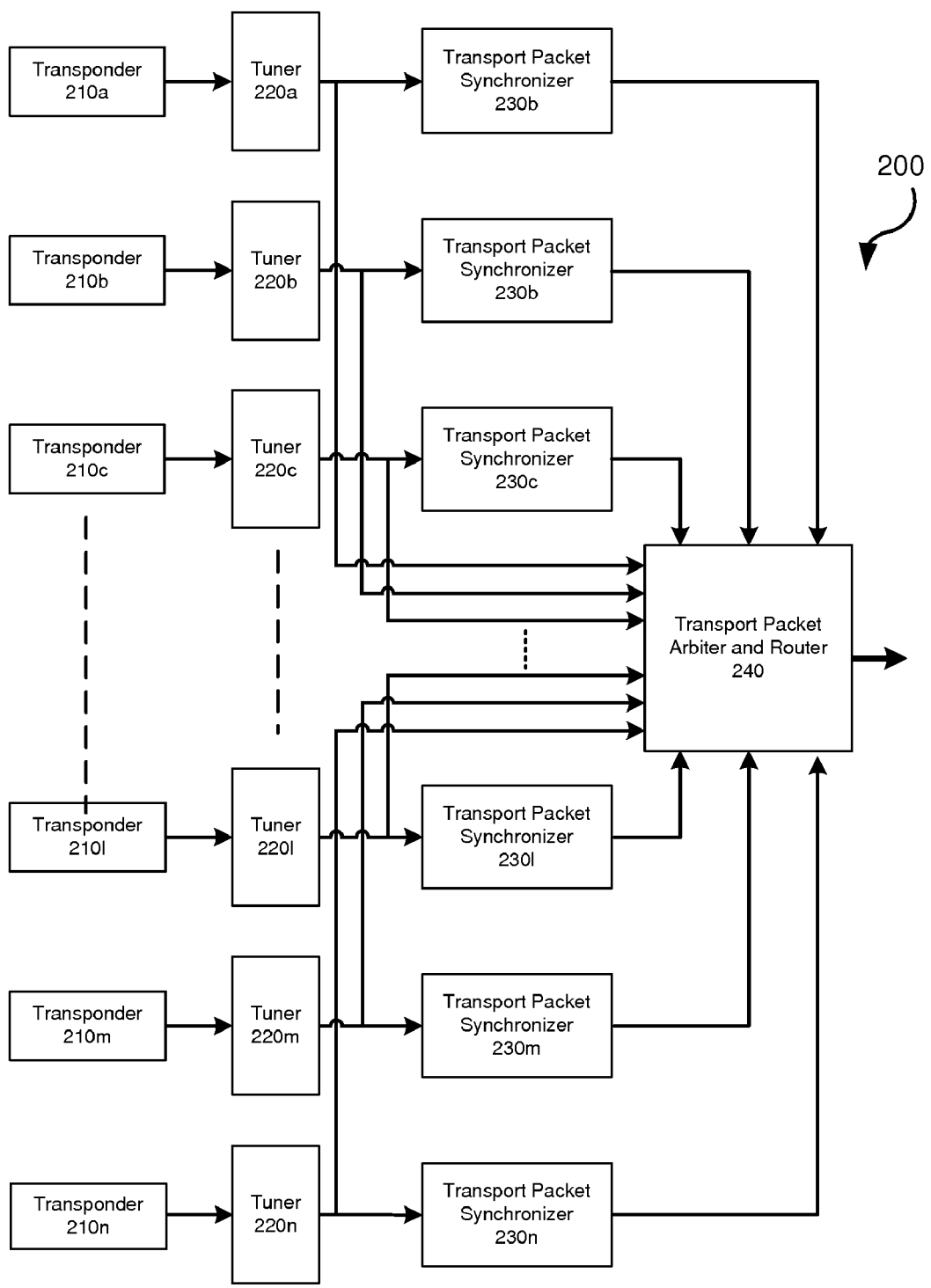
FIG. 2 illustrates a conventional system for synchronizing and routing multiple transponder transport streams.
Figure 3:
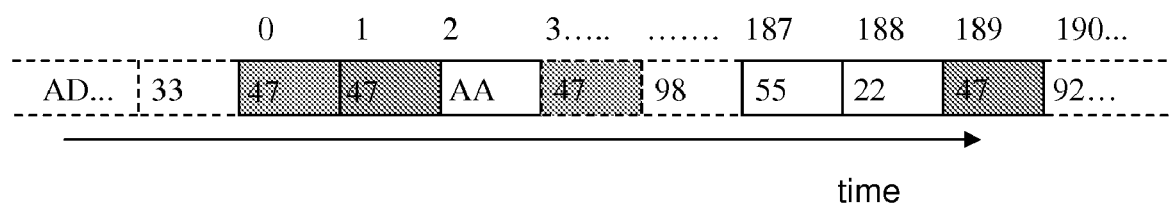
FIG. 3 illustrates a snapshot of a transport stream incoming from a tuner.

In one embodiment, the digital data sources 525a-525n are, for example, the outputs of the tuners 420a -420n in FIG. 4. The selected digital data source is output by the tuner selector 430 on a single channel. In one embodiment, each input to the tuner selector 430 has a format as shown in FIG. 1. An input to the tuner selector 430 is selected by the Tuner Select signal generated by control logic 530. Tuner selection is performed in consideration of currently un-synchronized tuners, and in a round robin order.

The output of the tuner selector 430 is connected to the transport packet synchronizer 440. The transport packet synchronizer 440 establishes the boundaries for incoming packets from the selected tuner output, and marks the boundaries with a sync signal.

The selected input 525 has been synchronized by the transport packet synchronizer 440. Each input 525 is provided with a corresponding sync timer 560 in the arbiter 450 to maintain packet timing. Upon the transport packet synchronizer 440 establishing the boundaries of an incoming packet, the transport packet synchronizer 440 indicates the start of the packet to the sync timer 560 corresponding to the selected input 525 by asserting the sync signal. The sync timer 560, once enabled by the sinc signal, is operable to generate periodic pulses indicative of the boundaries of a transport packet. The timing of the periodic pulses is determined by counting clock pulses from the moment indicated by the synchronizer as being the start of a packet.

The packet delay block 580 introduces a delay equal to the latency introduced by the transport packet synchronizer 440 to the corresponding tuner output 525. This delay is introduced to align the sync pulse generated by the sync timer 560 indicative of the start byte 0×47 of incoming packets to the tuner data. For example, if the transport packet synchronizer 440 has a latency of 3 clock cycles in detecting the sync byte, the sync signal of the transport packet synchronizer 440 will be asserted 3 clock cycles after the sync byte is received from the tuner. So, when the sync signal is asserted, the arbiter 450 would see the $4^{th}$ tuner byte. To see the first tuner byte simultaneously with the sync signal asserted by the transport packet synchronizer 440, the tuner data should be delayed by 3 clock cycles. Delaying the tuner data by three clock cycles aligns the sync byte 0×47 of the tuner data with the sync signal asserted by the transport packet synchronizer 440.

The packet delay block 580 is located in each sync timing logic block 550 of the arbiter 450. The delay is desirable to align the tuner sync byte with the sync signal asserted by the transport packet synchronizer 440.

The sync timer 560 receives the sync signal from transport packet synchronizer 440. This sync signal is asserted by the transport packet synchronizer 440 after detecting a sync byte. After receiving a sync signal, sync timer 560 generates a sync pulse every 188 clock cycles. The sync pulse generated by the sync timer 560 is delayed by the latency added by the transport packet synchronizer 440 as explained above. This delayed sync pulse is given to the sync pulse generator and monitor 570.

The sync pulse generator and monitor 570 receives input from packet delay block 580. The output of the packet delay block 580 is the delayed tuner data. The delay is equal to the latency added by the transport packet synchronizer 440. This packet delay aligns the tuner data with the sync pulses generated by the sync timer 560.

The sync pulse indicates to the pulse generator and monitor 570 that the delayed transport packet must contain a start of packet byte 0×47. If there is a start byte, the timer sync pulse is passed as the sync pulse along with the delayed transport packet to the output of the arbiter 450. This is shown in FIG. 5 by two thick lines terminating in two horizontal arrows 590 and 595 representing, respectively, the n packet streams and sync pulses from the timing logic blocks 550a-550n.

A count of simultaneous detections of sync pulse and start byte is kept in a 3-bit register in the sync pulse generator and monitor block 570. The monitor 570 watches the sync pulse from the sync timer 560 and the start byte from the delayed transport packet 580 for a predetermined, user programmable, number of times before confirming and passing on the sync pulse to the output of the arbiter 450. The sync pulses for the corresponding tuner 420 are passed on only if the above condition is met.

Also, the monitor 570 can decide not to pass on the sync pulses if the sync pulse from the sync timer 560 and the delayed start byte from the packet delay block 580 do not match in the same clock cycle for a consecutive predetermined, user programmable, number of clock cycles.

A count of continuous misses of sync pulse is kept in a 3-bit register in the sync pulse generator and monitor block 570. Upon determining that the stored number of sync pulse misses exceeds a predetermined number, the sync pulse generator and monitor 570 informs the control logic 530 via an out-of-sync signal to re-synchronize the corresponding tuner. The control logic 530 further maintains the status of the tuners and includes deadlock avoidance logic. The deadlock avoidance logic includes a timer mechanism that requires the synchronizer 440 to synchronize a selected tuner within a fixed predetermined period of time. If synchronisation is not achieved in this period, the control logic 530, which is a part of arbiter 450, selects the next tuner in round robin order.

Figure 6:
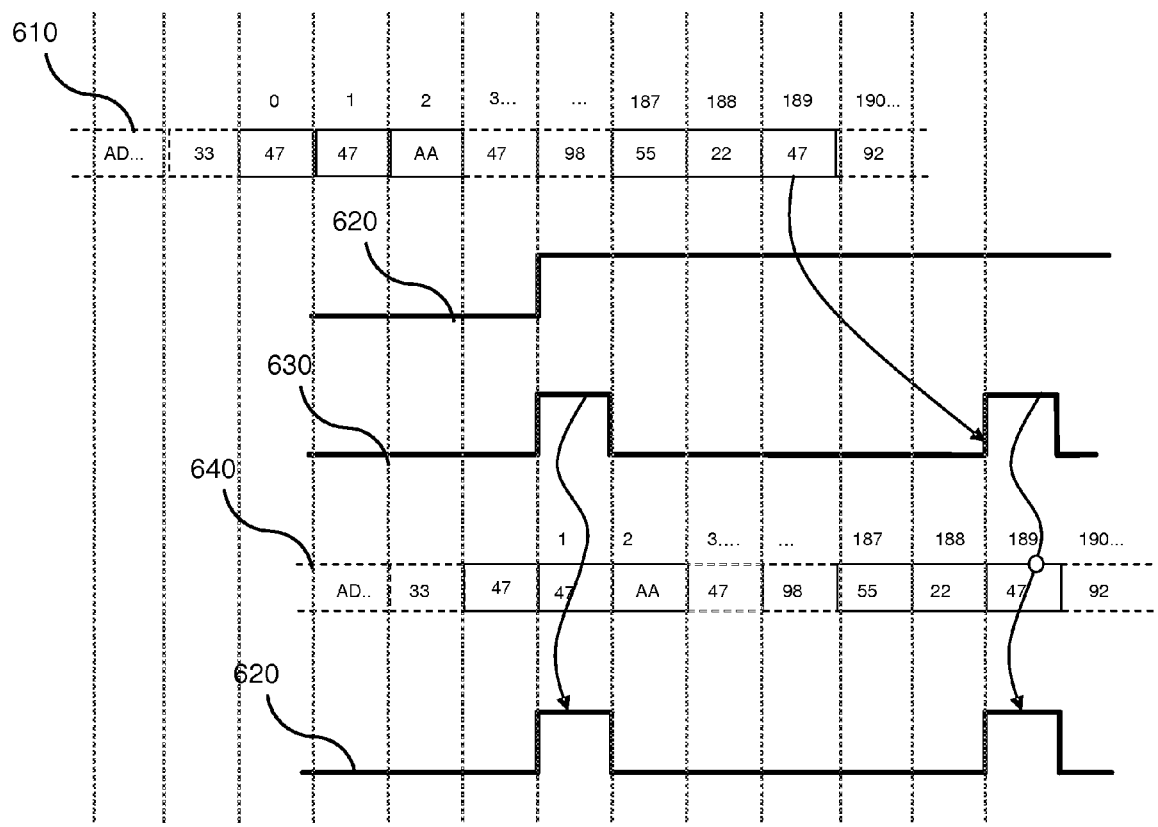
FIG. 6 is a timing diagram illustrating the operation of the system of FIG. 4 on an exemplary transport packet stream.

In the timing diagram of FIG. 6, the first waveform 610 illustrates the incoming packet to the Transport packet synchronizer 440. The Second waveform 620 illustrates the sync signal. This is an output of the transport packet synchronizer 440.

Once the sync byte is detected (indicated by the rising edge of the waveform 620), the corresponding sync timer 560 in the arbiter 450 is enabled and the timer pulses start at this instant. The timer 560 outputs a pulse every 188 clocks. This is illustrated in the $3^{rd}$ waveform 630.

The corresponding incoming Transport stream (waveform 610) is delayed to match the timer output pulses with the sync bytes. To do this, the incoming tuner data packet is delayed such that the sync timer output pulses and the start byte of the packet are valid and aligned in the same cycle. The delayed transport packet (tuner data) waveform is illustrated by the $4^{th}$ waveform 640.

The $5^{th}$ waveform 650 is generated by the "sync pulse generator and the Monitor" logic 570. This waveform is the same as the sync pulse waveform 630 generated by the sync timer 560, which would occur if the first "predetermined number" mentioned above were zero.

According to the disclosed system, one synchronizer is used to synchronize the outputs of multiple tuners. As a synchronizer requires memory to store transport packets, reducing the number of synchronizers required reduces the amount of memory required. The disclosed invention reduces the amount of memory usage by N, where N is the number of synchronizers per transponder. The amount of logic and memory required is hence significantly reduced as compared with the conventional system.

Under the conventional method, it is difficult to realise a chip which supports multiple transponders in a cost effective manner. As the synchronization logic is replicated a number of lo times for the corresponding transponders, the silicon area increases considerably. Setup and production expenses therefore increase accordingly. The disclosed system reduces a required amount of chip area considerably without compromise on the functionality.

The foregoing describes only some embodiments of the present invention, and modifications and/or changes can be made thereto without departing from the scope and spirit of the invention, the embodiments being illustrative and not restrictive.

We claim:

1. A transport stream synchronizing system for synchronizing transport streams output from a plurality of transponders and decoded by a plurality of tuners, the transport stream synchronizing system comprising:
    a tuner selector operable to select one transport stream out of a plurality of transport streams decoded by the plurality of tuners;
    a transport packet synchronizer operable to receive the transport stream selected by the tuner selector, and synchronize the received transport stream; and
    a transport packet arbiter and router operable to receive a synchronized transport stream from the selected tuner, and route the received synchronized transport stream to a predetermined destination, wherein the transport packet arbiter and router comprises a timer mechanism, and wherein the transport packet arbiter and router is operable to select a next tuner for synchronization of the corresponding transport stream when a time counted by the timer mechanism has elapsed and a transport stream being synchronized has not been synchronized.

2. The transport stream synchronizing system according to claim 1, wherein the transport packet arbiter and router selects one of the plurality of tuners for synchronization of the corresponding transport stream, and informs the tuner selector to select the corresponding transport stream.

3. The transport stream synchronizing system according to claim 2, wherein the transport packet arbiter and router selects tuners in a round robin order.

4. The transport stream synchronizing system according to claim 1, wherein the transport packet arbiter and router maintains a list of a synchronization status for each of the plurality of tuners.

5. The transport stream synchronizing system according to claim 1, wherein the transport packet arbiter and router periodically checks the synchronization status of each of the plurality of tuners.

6. A transport stream synchronizing system for synchronizing transport streams output from a plurality of transponders and decoded by a plurality of tuners, the transport stream synchronizing system comprising:
    a tuner selector operable to select one transport stream out of a plurality of transport streams decoded by the plurality of tuners;
    a transport packet synchronizer operable to receive the transport stream selected by the tuner selector, and synchronize the received transport stream; and
    a transport packet arbiter and router operable to receive a synchronized transport stream from the selected tuner, and route the received synchronized transport stream to a predetermined destination, wherein the transport packet arbiter and router periodically checks the synchronization status of each of the plurality of tuners, and wherein the transport packet arbiter and router selects a tuner for re-synchronization of the corresponding transport stream when it is determined that the corresponding transport stream has dropped out of synchronization.

7. A transport stream synchronizing system for synchronizing transport streams output from a plurality of transponders and decoded by a plurality of tuners, the transport stream synchronizing system comprising:
    a tuner selector operable to select one transport stream out of a plurality of transport streams decoded by the plurality of tuners;
    a transport packet synchronizer operable to receive the transport stream selected by the tuner selector, and synchronize the received transport stream;
    a transport packet arbiter and router operable to receive a synchronized transport stream from the selected tuner, and route the received synchronized transport stream to a predetermined destination; and
    a delay block associated with each transport stream, each delay block operable to impart a delay to the associated transport stream equal to the latency of the transport packet synchronizer.

8. A method for synchronizing transport streams output from a plurality of transponders and decoded by a plurality of tuners, comprising:
    selecting, by a tuner selector, one transport stream out of a plurality of transport streams decoded by the plurality of tuners;
    receiving, at a transport packet synchronizer, the transport stream selected by the tuner selector, and synchronizing the received transport stream to produce a synchronized transport stream;
    receiving, at a transport packet arbiter and router, the synchronized transport stream from the selected tuner, and routing the received synchronized transport stream to a predetermined destination; and
    selecting a next tuner for synchronization of the corresponding transport stream when a time counted by a timer mechanism has elapsed and at least one transport stream has not been synchronized.

9. The method of claim 8, wherein the transport packet arbiter and router selects one of the plurality of tuners for synchronization of the corresponding transport stream; and informs the tuner selector to select the corresponding transport stream.

10. The method of claim 9, wherein the selection of the tuners is in a round robin order.

11. The method of claim 8, further comprising maintaining a list of a synchronization status for each of the plurality of tuners.

12. The method of claim 8, further comprising periodically checking the synchronization status of each of the plurality of tuners.

13. The method of claim 12, further comprising selecting a tuner for re-synchronization of the corresponding transport stream when it is determined that the corresponding transport stream has dropped out of synchronization.

14. The method of claim 8, further comprising imparting a delay to the associated transport stream equal to the latency of the transport packet synchronizer.

* * * * *